(No Model.) 2 Sheets—Sheet 1.
A. J. CREAMER.
BLACKBOARD ERASER.
No. 521,258. Patented June 12, 1894.
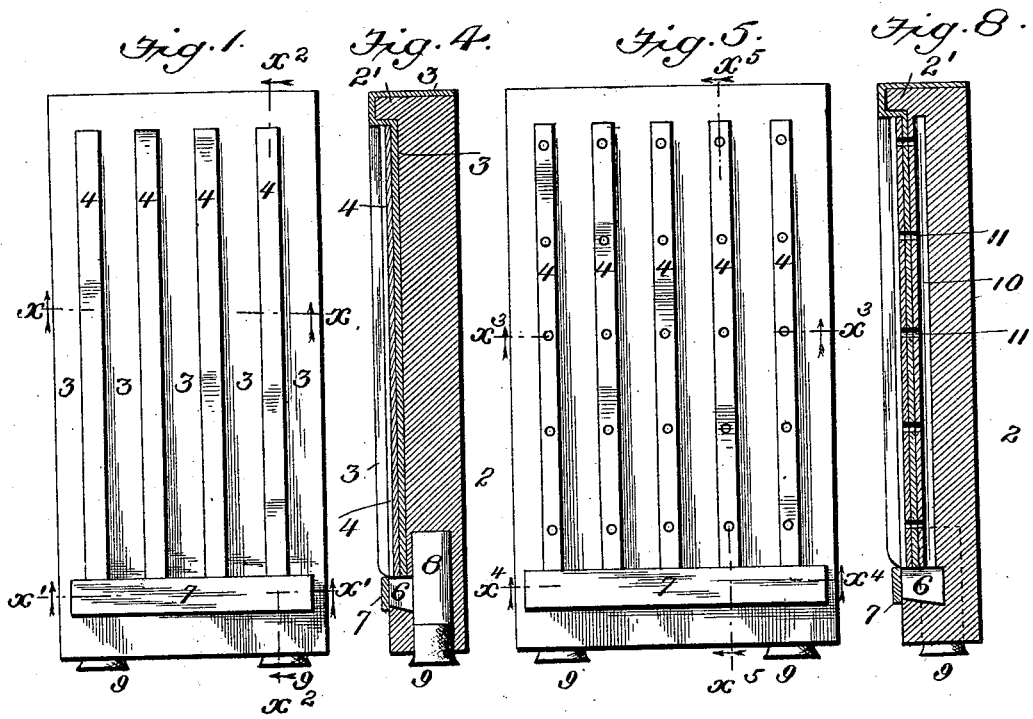
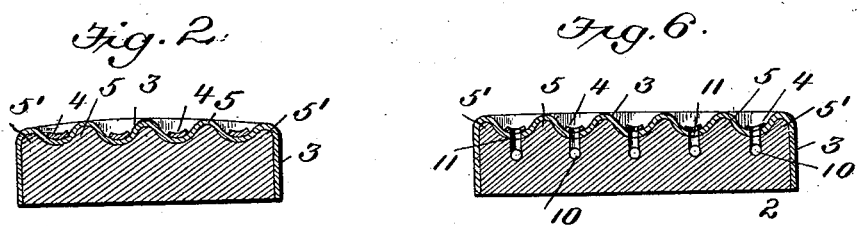
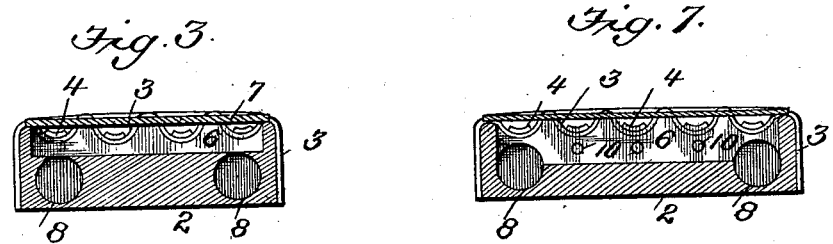
Witnesses
Inventor
Albert J. Creamer,
By Eugene L. Arnott
Attorney (No Model.) 2 Sheets—Sheet 2.
A. J. CREAMER.
BLACKBOARD ERASER.
No. 521,258. Patented June 12, 1894.
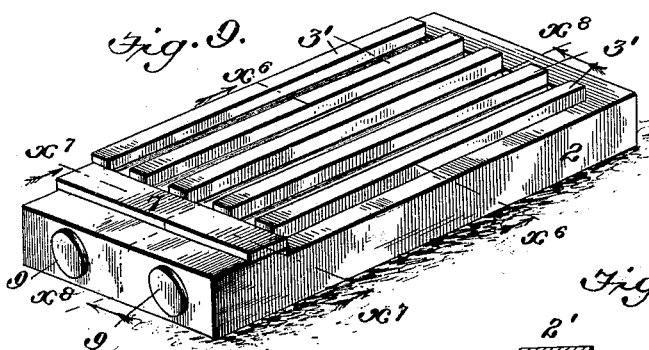
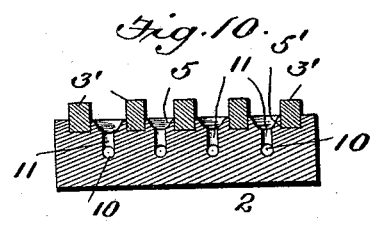
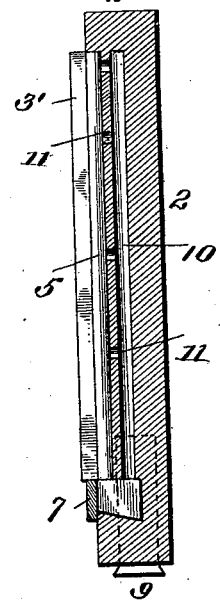
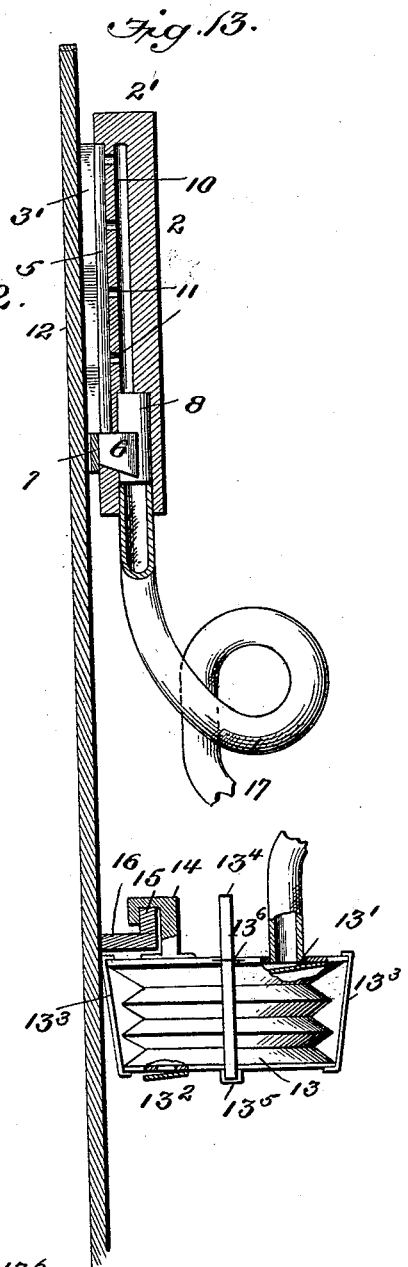
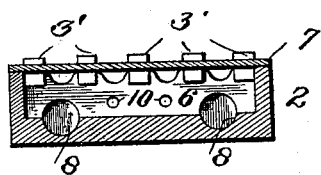
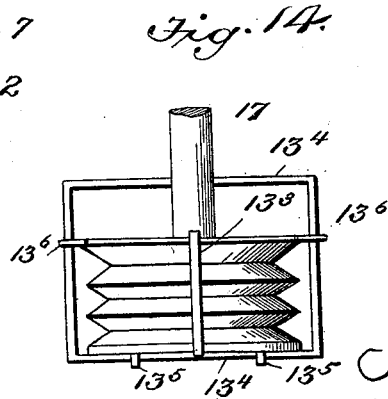
Witnesses
John Irvine
Albert M. MacKerley
Inventor
Albert J. Creamer,
By Eugene L. Arnott,
Attorney

UNITED STATES PATENT OFFICE.

ALBERT J. CREAMER, OF WASHINGTON COURT-HOUSE, OHIO.

BLACKBOARD-ERASER.

SPECIFICATION forming part of Letters Patent No. 521,258, dated June 12, 1894.

Application filed March 30, 1893. Serial No. 468,395. (No model.)

*To all whom it may concern:*

Be it known that I, ALBERT J. CREAMER, a citizen of the United States, and a resident of Washington Court-House, in the county of Fayette and State of Ohio, have invented certain new and useful Improvements in Blackboard-Erasers, of which the following is a specification, reference being had to the accompanying drawings.

This invention relates to black-board erasers, and its object is to produce an eraser which will be effective in operation and at the same time retain the erased chalk-dust, thus preventing the dust, which is very disagreeable and injurious, from flying off into the room.

The novelty of the invention will be hereinafter fully set forth and specifically pointed out in the claims.

In the accompanying drawings Figure 1 is an elevation showing the face or erasing surface of an eraser embodying my invention. Fig. 2 is a cross-section taken on the line $x\ x$ of Fig. 1. Fig. 3 is a cross-section taken on the line $x'\ x'$ of Fig. 1. Fig. 4 is a longitudical section taken on the line $x^2\ x^2$ of Fig. 1. Fig. 5 is a view similar to Fig. 1, but showing a slightly modified form of construction. Fig. 6 is a cross-section taken on the line $x^3\ x^3$ of Fig. 5. Fig. 7 is a cross-section taken on the line $x^4\ x^4$ of Fig. 5. Fig. 8 is a longitudinal section taken on the line $x^5 x^5$ of Fig. 5. Fig. 9 is a perspective view showing a slightly modified form of eraser. Fig. 10 is a cross-section taken on the line $x^6 x^6$ of Fig. 9. Fig. 11 is a cross-section taken on the line $x^7\ x^7$ of Fig. 9. Fig. 12 is a longitudinal section taken on the line $x^8\ x^8$ of Fig. 9. Fig. 13 is a view showing the eraser in section as applied to a black-board, together with a bellows attachment. Fig. 14 is a detached view of the bellows attachment, representing a front view of the bellows shown in Fig. 13.

This invention consists in an eraser of the improved construction hereinafter fully described, and pointed out in the appended claims.

In the drawings the body-portion of the eraser is represented by the numeral 2 and its grooved or corrugated erasing surface is covered with cloth or other soft material, represented by 3, in order that the black-board may not be scratched or scored. Curved metal plates 4 are placed over the cloth and secured in the grooves between ribs or ridges 5, thus drawing the cloth down firmly over said ribs or ridges and holding it securely in position. These plates should not be made broad enough to touch the black-board. The ridges 5 and corresponding intermediate grooves which are preferably uniform and parallel, do not extend the whole length of the eraser-block, but terminate at one end in a chamber or receptacle 6. This chamber or receptacle is preferably formed in the eraser-block, and is inclosed on one side by plate 7. One or more openings 8 communicate with chamber 6 and are closed by corks or stoppers 9.

When the eraser is applied to a black-board, with the chamber 6 downward, the chalk-dust, which is erased by the covering over ridges 5, gravitates down through the grooves into chamber 6, where it is retained until purposely discharged. The end 2' of the eraser, opposite chamber 6, has its erasing surface in the plane of the erasing surface of ridges 5, thus preventing the dust from escaping upwardly. The outer ridge 5' at either side is made slightly lower or smaller than the others in order to prevent said ridge from striking and erasing the chalk-dust and liberating it in the room after the manner of an ordinary eraser. The outside ridge 5' does not touch the board, but passes over the line to be erased, while its corresponding or contiguous groove confines the chalk-dust erased by the adjacent ridge and conducts it down to chamber 6. The remaining grooves gather up whatever dust may be left by the first groove and conduct it to the dust chamber. It is true that a small quantity of dust will escape into the room, but the main portion will be deposited in chamber 6. It is obvious that plate 7 should be so placed as to come as near as possible to the black-board without touching it, in order to prevent the dust from sifting down between said plate and board and thus escaping into the room.

When it is desired to empty the chalk-dust from chamber 6 it is only necessary to remove the stoppers 9 from openings 8, which latter also serve as store-rooms for the dust, whereupon said chamber and openings may be easily cleaned, as will be readily understood. When the stoppers are replaced the eraser is again ready for operation.

In Figs. 5, 6, 7, 8, 9, 10, 11, 12, and 13 an opening or passage-way 10 is shown directly under each groove and extending the full length thereof. A number of openings or perforations 11 are formed in the bottom of each groove and said openings or perforations communicate with openings 10. The latter communicate with chamber 6. With this construction the chalk-dust not only gravitates down through the grooves between ridges 5 but also passes through perforations 11 and openings 10 to chamber 6.

In Figs. 9, 10, 11, 12, and 13 the plates 4 and cloth or covering 3 are omitted, and the ridges 5 and 5′ are grooved or recessed to receive the erasing strips 3′. These strips are made of heavy felt or other suitable material and glued or otherwise secured in position in said grooves or recesses, as shown.

In Fig. 13 the eraser is shown as applied to a black-board 12, together with a bellows or air-suction attachment 13. The latter may be made of any desired construction, and is preferably provided with a supporting hook 14 designed to engage the guard rail 15 of the black-board chalk-receptacle 16.

In operation with the bellows attachment one of the corks 9 is removed from opening 8 and the end of a flexible tube 17 made of india-rubber or other suitable material is inserted in said opening, the other end of said tube being inserted in an opening in bellows 13. Said bellows has two check-valves 13′ and 13², one opening inwardly and one opening outwardly with reference to the bellows. The bellows has a handle 13⁴, which is rectangular in form, surrounds the bellows, and is secured to the bottom thereof by staples 13⁵. This handle reciprocates vertically in staples or rings 13⁶, which are secured to the top of the bellows. Spring-bands 13³, preferably made of india-rubber, hold the bellows normally contracted. When the eraser is applied to the blackboard the hand is applied to the top of handle 13⁴ and by pressing downwardly the bellows is gradually expanded or drawn out against the tension of spring-bands 13³, whereupon valve 13² closes, valve 13′ opens, and air is admitted to the bellows through pipe 17. The latter swallows up all the dust created by the eraser, since a draft is created not only through chamber 6 but also through perforations 11 and openings 10, leading to bellows 13. When the bellows is compressed the valve 13′ closes and prevents the air and dust from re-entering tube 17.

It may be stated that the bellows 13 may in most cases be dispensed with in view of the high degree of efficiency obtained by the use of the eraser alone as hereinbefore set forth.

I have described my invention as a blackboard eraser; but it may obviously be used for cleaning the dust from window glass, mirrors, plastered walls, papered walls, and other smooth surfaces.

Having thus described my invention, what I claim as new, and desire to secure by Letters Patent, is—

1. As a new article of manufacture, an eraser consisting of a body portion provided with parallel ribs or ridges, a transverse chamber at one end of the body portion and communicating with the spaces between the ribs or ridges, said chamber being formed with a discharge opening, and provided with a removable stopper, substantially as described.

2. As an improved article of manufacture, a black-board eraser comprising a body portion having erasing ridges and a chamber or receptacle communicating with the grooves between said ridges, said chamber or receptacle being designed to receive the chalk-dust, and the ridge 5′ at either side being lower or smaller than the other ridges 5, substantially as and for the purposes set forth.

3. As an improved article of manufacture, a black-board eraser comprising a body-portion having an erasing surface provided with grooves and ridges, and a chamber or receptacle communicating with the ends of said grooves, said chamber or receptacle being designed to receive the chalk-dust, and the ridge 5′ at either side being lower or smaller than the other ridges 5, substantially as set forth.

4. The combination with an eraser consisting of a body portion and parallel ribs or ridges, and provided at one end with a transverse dust chamber communicating with the spaces between said ribs or ridges, of a covering for the erasing surface, and metallic plates for securing said covering, substantially as described.

5. An eraser comprising a body portion and a series of ribs and grooves, a series of longitudinal openings below said grooves, a series of perforations 11, a transverse dust chamber at one end of the eraser body communicating with the ends of the grooves, and with the ends of the openings below the grooves, and a discharge opening or openings in said dust chamber provided with removable stoppers, substantially as described.

6. The combination with an eraser provided with a dust chamber having a discharge opening substantially as described, of a bellows, and a tube connecting the bellows and dust chamber, substantially as set forth.

In testimony whereof I affix my signature in presence of two witnesses.

ALBERT J. CREAMER.

Witnesses:
C. A. WARE,
W. O. KINKEAD.